US012717508B2

(12) United States Patent
Roberts

(10) Patent No.: US 12,717,508 B2
(45) Date of Patent: Aug. 25, 2026

(54) DATA REARRANGEMENT TECHNIQUES FOR MEMORY

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 172 days.

(21) Appl. No.: 18/643,936

(22) Filed: Apr. 23, 2024

(65) Prior Publication Data

US 2025/0004659 A1 Jan. 2, 2025

Related U.S. Application Data

(60) Provisional application No. 63/510,532, filed on Jun. 27, 2023.

(51) Int. Cl.
*G06F 3/00* (2006.01)
*G06F 3/06* (2006.01)

(52) U.S. Cl.
CPC .......... *G06F 3/0647* (2013.01); *G06F 3/0604* (2013.01); *G06F 3/0608* (2013.01); *G06F 3/064* (2013.01); *G06F 3/0679* (2013.01)

(58) Field of Classification Search
CPC ...... G06F 3/0647; G06F 3/064; G06F 3/0604; G06F 3/0608
See application file for complete search history.

(56) References Cited

U.S. PATENT DOCUMENTS

2017/0133100 A1* 5/2017 Seekins ............... G06F 11/0793
2021/0124657 A1* 4/2021 Kamran .................. G06F 9/547

* cited by examiner

*Primary Examiner* — Reginald G Bragdon
*Assistant Examiner* — Michael L Westbrook
(74) *Attorney, Agent, or Firm* — Holland & Hart LLP

(57) ABSTRACT

Methods, systems, and devices for techniques for coupled host and memory dies are described. A controller of a memory system may facilitate data rearrangement within a block-addressable memory device based on metadata associated with prefetching data to a byte-addressable memory device or to a host system. For example, the controller may utilize the metadata and various access commands to rearrange associated data within the block-addressable memory device such that the data is written to a singular superblock of the block-addressable memory device. In some examples, one or more counters may be utilized by the controller to determine whether to rearrange the data within the block-addressable memory device.

19 Claims, 7 Drawing Sheets

400

Access, by a controller of a memory system including a first memory device having a first type of memory and a second memory device having a second type of memory, metadata associated with a prefetch operation to transfer data from the first memory device to the second memory device

605

Transmit, from the controller to the first memory device based on accessing the metadata, a command to write first data associated with a first superblock of the first memory device and second data associated with a second superblock of the first memory device to a third superblock of the first memory device based at least in part on a value of a counter satisfying a threshold

610

Figure 7:
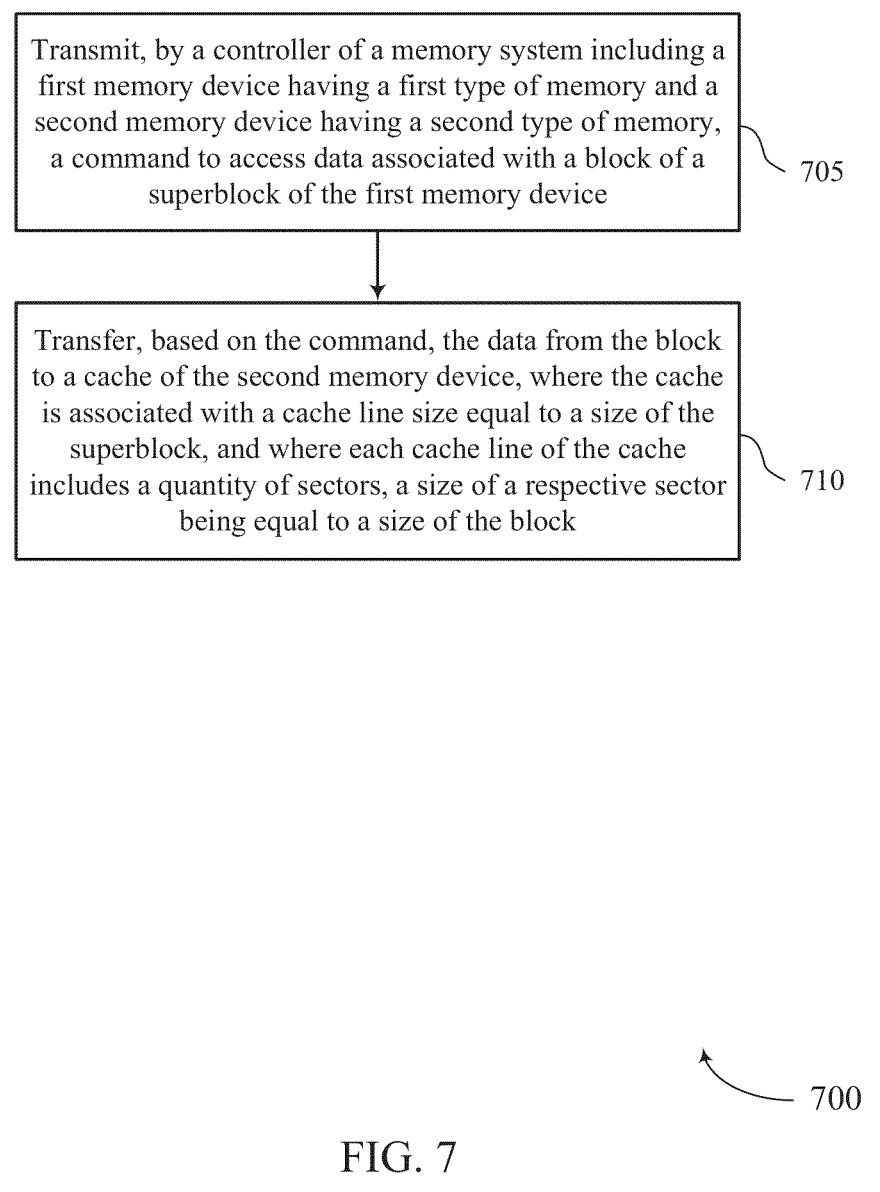

Transmit, by a controller of a memory system including a first memory device having a first type of memory and a second memory device having a second type of memory, a command to access data associated with a block of a superblock of the first memory device

705

Transfer, based on the command, the data from the block to a cache of the second memory device, where the cache is associated with a cache line size equal to a size of the superblock, and where each cache line of the cache includes a quantity of sectors, a size of a respective sector being equal to a size of the block

DATA REARRANGEMENT TECHNIQUES FOR MEMORY

CROSS REFERENCE

The present Application for Patent claims priority to U.S. Patent Application No. 63/510,532 by David Andrew Roberts, entitled "DATA REARRANGEMENT TECHNIQUES FOR MEMORY," filed Jun. 27, 2023, which is assigned to the assignee hereof, and which is expressly incorporated by reference in its entirety herein.

TECHNICAL FIELD

The following relates to one or more systems for memory, including data rearrangement techniques for memory.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

BRIEF DESCRIPTION OF THE DRAWINGS

FIGS. 5 through 7 show examples of flowcharts that support data rearrangement techniques for memory in accordance with examples as disclosed herein.

DETAILED DESCRIPTION

Figure 1:
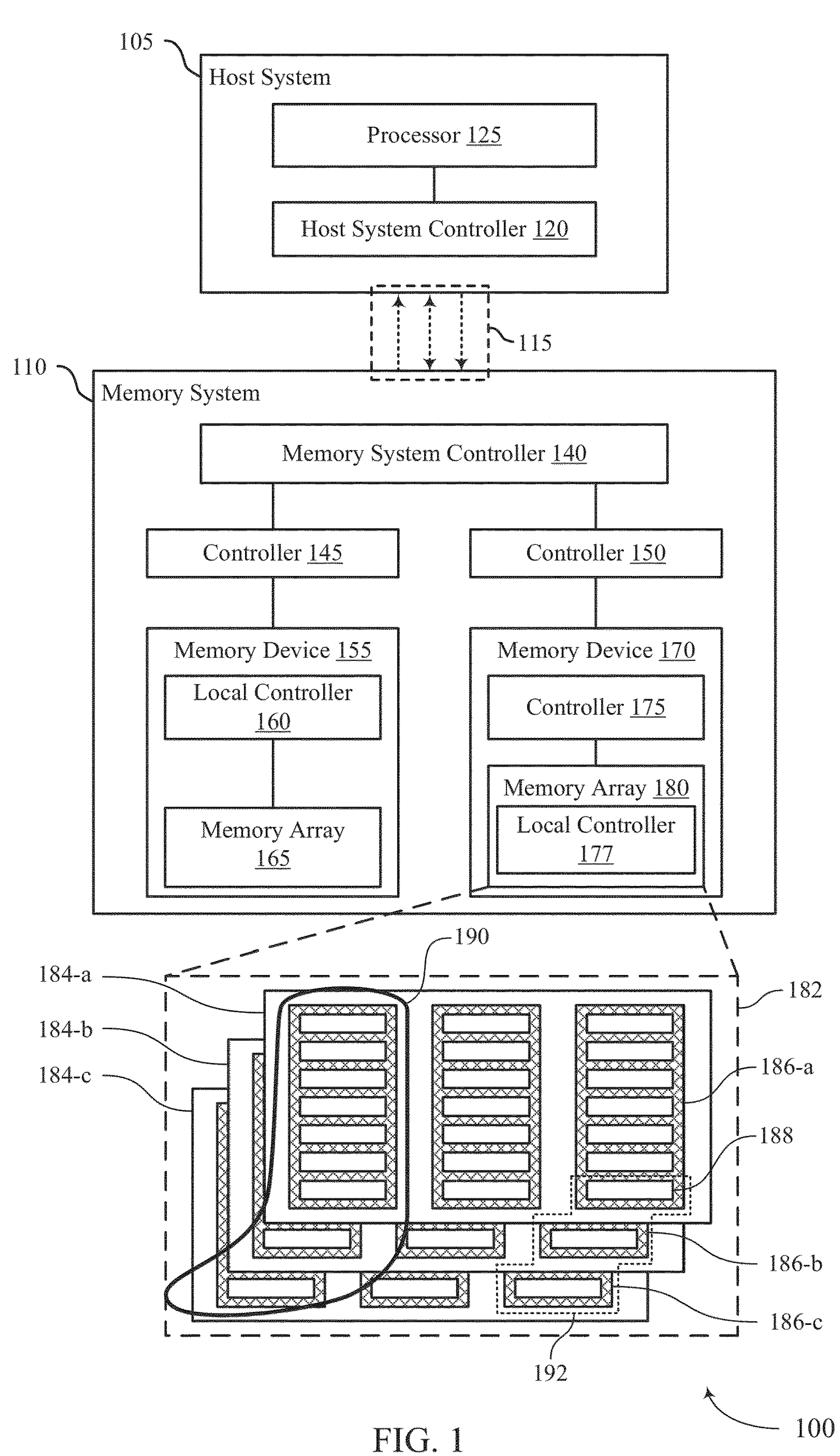
FIGS. 1 through 3 show examples of systems that supports data rearrangement techniques for memory in accordance with examples as disclosed herein.

Some systems may include various types of memory that are addressable at different levels of granularity. For example, a system may include, among other types of memory, memory that is addressable at a block level of granularity, which may be referred to as block-addressable memory, and include memory that is addressable at a byte level of granularity, which may be referred to as byte-addressable memory. In some cases, a block-addressable memory device (e.g., NAND flash memory, solid state disks (SSDs) using an non-volatile memory express (NVMe) interface) may be characterized by various limitations that may negatively affect their performance. For example, these devices may include high sequential access latency (e.g., accessing sequentially addressed blocks), even higher random access latency (e.g., accessing random blocks), asymmetric latency (e.g., higher write latency than read latency), lower bandwidth relative to byte-addressable memory devices, wear-out (e.g., low write endurance), or a combination thereof. However, these block-addressable memories may also include high storage capacities of non-volatile memory, for example, which may be relatively cheaper than byte-addressable memory. Some byte-addressable memories (e.g., dynamic random-access memory (DRAM), for example, attached via a compute express link (CXL) interface), conversely, may exhibit lower latencies higher bandwidths, and higher access symmetricity, for example, for fine-grained (e.g., page-line sized) sequential and random access operations relative to block-addressable memory. These byte-addressable memories, however, may also include volatile memory which may be unsuitable for storing data for an extended period of time (e.g., without being connected to power).

In accordance with examples described herein, a controller of a system that includes block-addressable and byte-addressable memory devices (e.g., a hybrid memory module) may guide data rearrangement such that the performance and efficiency of block-addressable memory devices may be improved. For example, the controller may utilize metadata associated with prefetching data from a block-addressable memory device and various access commands to rearrange associated data within a block-addressable memory device such that the data is written to a singular superblock (e.g., page-line) of the block-addressable memory device. This data rearrangement may enable the controller to manipulate and store the data within the superblocks of a block-addressable memory device such that the storage of data within superblocks may be efficiently utilized, for example, to subsequently perform sequential data accesses (e.g., rather than random accesses).

In some examples, one or more counters (e.g., confidence components) may be utilized by the controller to determine whether to rearrange the data of blocks in the block-addressable memory device. For example, counters that track quantities of accesses to metadata associated with prefetching may be used to rearrange data that is likely to be subsequently accessed, for instance, as part of a prefetch operation. Additionally, or alternatively, a data cache organization and replacement policy in a byte-addressable memory device described herein may be utilized to further contribute to efficient data management and data transfer between byte-addressable and block-addressable memory, such as to reduce wear-out and increase write bandwidth. These techniques may be implemented in a main memory-like setting, such as a CXL main memory module, which may allow commonly-seen and predictable main memory loop strides to drive a memory-side data prefetcher (e.g., traditionally only seen on host processor chips) such that overall bandwidth may increase, while latency and wear-out may decrease.

Features of the disclosure are illustrated and described in the context of systems and architectures. Features of the disclosure are further illustrated and described in the context of systems, block diagrams, and flowcharts.

FIG. 1 illustrates an example of a system 100 that supports data rearrangement techniques for memory in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, a processing component) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140, one or more memory devices 155 (e.g., memory packages, memory dies, memory chips) operable to store data, and one or more memory devices 170. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 155 or a memory device 170 to the host system 105, or receive a refresh command indicating that the memory system 110 is to refresh data stored in a memory device 155 or a memory device 170, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 155, one or more memory device 170, or a processor 125. In some examples, a memory system controller 140 may control operations of the memory system 110 in cooperation with the host system controller 120, a controller 145 coupled with the one or more memory device 155, a local controller 160 of a memory device 155, a controller 150 coupled with the one or more memory devices 170, a controller 175 of a memory device 170, a local controller 177 of a memory array 180 of a memory device 170, or any combination thereof. Although the example of memory system controller 140 is illustrated as a separate component of the memory system 110, in some examples, aspects of the functionality of the memory system 110 may be implemented by a processor 125, a host system controller 120, or any combination thereof.

A memory system 110 may be a hybrid memory system (e.g., a hybrid memory module) that includes various types of memory devices operable to store data. For example, in the example of FIG. 1, the memory devices 155 may be volatile memory devices (e.g., memory devices that include volatile memory cells), and the memory devices 170 may be non-volatile memory devices (e.g., memory devices that include non-volatile memory cells). For instance, each memory device 155 may include one or more memory arrays 165, and each memory device 170 may include one or more memory arrays 180. A memory array may be a collection of memory cells (e.g., a two-dimensional array, a three-dimensional array), with each memory cell being operable to store data (e.g., as one or more stored bits). A memory array 165 may include volatile memory cells of various architectures, such as random access memory (RAM) cells, dynamic RAM (DRAM) cells, synchronous dynamic RAM (SDRAM) cells, static RAM (SRAM) cells, or a combination thereof, among other types of volatile memory cells. A memory array 180 may include non-volatile memory cells of various architectures, such as not-and (NAND) (e.g., NAND flash) memory, read-only memory (ROM), phase change memory (PCM), self-selecting memory, other chalcogenide-based memories, ferroelectric random access memory (FeRAM), magneto RAM (MRAM), not-or (NOR) (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof, among other types of non-volatile memory cells.

In some examples, each memory device 155 may include a local controller 160. A local controller 160 may include at least one of one or more components (e.g., circuitry, logic, instructions) operable to control operations of a memory device 155. In some examples, a local controller 160 may be operable to communicate (e.g., receive or transmit data or commands or both) with a memory system controller 140, such as via a controller 145. For example, a controller 145 may be a volatile memory controller coupled with the memory system controller 140 that may be operable to control operations of the one or more memory devices 155. A controller 145 may be coupled with or included in the memory system controller 140 and may be operable to communicate signaling between the memory system controller 140 and the one or more memory devices 155. In some examples, a memory system 110 may not include a memory system controller 140 and/or a controller 145, and a local controller 150 or a host system controller 120 may perform functions of a memory system controller 140 and/or a controller 145 described herein. In some examples, a local controller 150, a controller 145, a memory system controller 140, or a combination thereof may include decoding components operable for accessing addresses of a memory array 165, sense components for sensing states of memory cells of a memory array 165, write components for writing states to memory cells of a memory array 165, or various other components operable for supporting described operations of a memory system 110.

A memory device 170 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

A memory device 170 may include a controller 175. A controller 175 may be coupled with and communicate with the host system 105, such as via a memory system controller 140, a controller 150, or a combination thereof. For example, a controller 150 may be a non-volatile memory controller coupled with the memory system controller 140 that may be operable to control operations of the one or more memory devices 170. A controller 150 may be coupled with or included in the memory system controller 140 and may be operable to communicate signaling between the memory system controller 140 and the one or more memory devices 170.

A controller 175 may be an example of a controller or control component configured to cause the memory device 170 to perform various operations in accordance with examples as described herein. The controller 175 may also be coupled with and communicate with memory arrays 180 to perform operations such as reading data, writing data, erasing data, or refreshing data at a memory array 180—among other such operations—which may generically be referred to as access operations. In some cases, the controller 175 may receive commands from the host system 105 and/or memory system controller 140 and communicate with one or more memory arrays 180 to execute such commands. For example, the controller 175 may receive commands or operations from the host system 105 (e.g., via the memory system controller 140 and/or controller 150) or from the memory system controller 140 (e.g., via the controller 150) and may convert the commands or operations into instructions or appropriate commands to achieve the desired access of the memory arrays 180.

The controller 175 may be configured for other operations associated with the memory arrays 180. For example, the controller 175 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 or memory system controller 140 and physical addresses (e.g., physical block addresses) associated with memory cells within the memory arrays 180.

The controller 175 may include hardware such as one or more integrated circuits or discrete components, a buffer memory, or a combination thereof. The hardware may include circuitry with dedicated (e.g., hard-coded) logic to perform the operations ascribed herein to the controller 175. The controller 175 may be or include a microcontroller, special purpose logic circuitry (e.g., an FPGA, an ASIC, a DSP), or any other suitable processor or processing circuitry.

The controller 175 may also include a local memory. In some cases, the local memory may include ROM or other memory that may store operating code (e.g., executable instructions) executable by the controller 175 to perform functions ascribed herein to the controller 175. In some cases, the local memory may additionally, or alternatively, include SRAM or other memory that may be used by the controller 175 for internal storage or calculations, for example, related to the functions ascribed herein to the controller 175. Additionally, or alternatively, the local memory may serve as a cache for the controller 175. For example, data may be stored in the local memory if read from or written to a memory array 180, and the data may be available within the local memory for subsequent retrieval for or manipulation (e.g., updating) by the host system 105 or memory system controller 140 (e.g., with reduced latency relative to a memory array 180) in accordance with a cache policy.

Although the example of the memory device 170 in FIG. 1 has been illustrated as including the controller 175, in some cases, a memory device 170 may not include a controller 175. For example, the memory device 170 may additionally, or alternatively, rely on an external controller (e.g., implemented by the host system 105), the memory system controller 140, the controller 150, one or more local controllers 177, which may be internal to memory arrays 180, or a combination thereof, to perform the functions ascribed herein to the controller 175.

In some examples, a memory array 180 may include (e.g., on a same die or within the same package) a local controller 177, which may execute operations on one or more memory cells of the respective memory array 180. A local controller 177 may operate in conjunction with a controller 175 or may perform one or more functions ascribed herein to the controller 175.

In some cases, a memory array 180 may be or include a NAND device (e.g., NAND flash device). A memory array 180 may be or include a die 182 (e.g., a memory die). For example, in some cases, a memory array 180 may be a package that includes one or more dies 182. A die 182 may, in some examples, be a piece of electronics-grade semiconductor cut from a wafer (e.g., a silicon die cut from a silicon wafer). Each die 182 may include one or more planes 184, and each plane 184 may include a respective set of block groups 186, where each block group 186 may include a respective set of blocks 188, and each block 188 may include a set of memory cells. In some examples, a block group 186 may be referred to as a block, and a block 188 may be referred to as a page.

In some cases, planes 184 may refer to groups of block groups 186 and, in some cases, concurrent operations may be performed on different planes 184. For example, concurrent operations may be performed on memory cells within different block groups 186 so long as the different block groups 186 are in different planes 184. In some cases, an individual block groups 186 may be referred to as a physical block, and a virtual block 190 may refer to a group of block groups 186 within which concurrent operations may occur. For example, concurrent operations may be performed on block groups 186-*a*, 186-*b*, and 186-*c*, that are within planes 184-*a*, 184-*b*, and 184-*c*, respectively, and block groups 186-*a*, 186-*b*, and 186-*c* may be collectively referred to as a virtual block 190. In some cases, a virtual block may include block groups 186 from different memory arrays 180. In some cases, the block groups 186 within a virtual block 190 may have the same block address within their respective planes 184 (e.g., block group 186-*a* may be "block 0" of plane 184-*a*, block group 186-*b* may be "block 0" of plane 184-*b*, and so on). In some cases, performing concurrent operations in different planes 184 may be subject to one or more restrictions, such as concurrent operations being performed on memory cells within different blocks 188 that have the same block address within their respective planes 184 (e.g., related to command decoding, page address decoding circuitry, or other circuitry being shared across planes 184).

In some cases, a block group 186 may include memory cells organized into rows (blocks 188) and columns (e.g., strings, not shown). For example, memory cells in a same block 188 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a block level of granularity, or portion thereof) but may be erased at a second level of granularity (e.g., at a block group level of granularity). That is, a block 188 may be the smallest unit of memory (e.g., set of memory cells) that may be independently programmed or read (e.g., programed or read concurrently as part of a single program or read operation), and a block group 186 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used block 188 may, in some cases, not be updated until the entire block group 186 that includes the block 188 has been erased.

In some examples, a superblock 192 may refer to a single row of blocks 188 of a virtual block 190. For example, a superblock 192 corresponding to a first row of a virtual block 190 may include the first block 188 of each block group 186 included in the virtual block 190. In some examples, a superblock 192 may include a same block 188 within each plane 184 of a die 182. In some examples, a superblock 192 may be referred to as a pageline.

In some cases, to update some data within a block group 186 while retaining other data within the block group 186, the controller 175 may copy the data to be retained to a new block group 186 and write the updated data to one or more remaining pages of the new block group 186. The memory array (e.g., the local controller 177) or the controller 175 may mark or otherwise designate the data that remains in the old block group 186 as invalid or obsolete and may update a logical-to-physical (L2P) mapping table to associate the logical address (e.g., LBA) for the data with the new, valid group 186 rather than the old, invalid group 186. In some examples, the L2P mapping table may be or be included in a flash translation layer (FTL) mapping table maintained by the memory device 170. In some cases, such copying and remapping may be performed instead of erasing and rewriting the entire old block group 186 due to latency or wearout considerations, for example. In some cases, one or more copies of an L2P mapping table may be stored within the memory cells of the memory array 180 (e.g., within one or more block groups 186 or planes 184) for use (e.g., reference and updating) by the local controller 177 or controller 175.

In some cases, L2P mapping tables may be maintained and data may be marked as valid or invalid at the block level of granularity, and a block 188 may contain valid data, invalid data, or no data. Invalid data may be data that is outdated, which may be due to a more recent or updated version of the data being stored in a different block 188 of the memory array 180. Invalid data may have been previously programmed to the invalid block 188 but may no longer be associated with a valid logical address, such as a logical address referenced by the host system 105 or memory system controller 140. Valid data may be the most recent version of such data being stored on the memory array 180. A block 188 that includes no data may be a block 188 that has never been written to or that has been erased and may be referred to as an empty block. A superblock 192 that includes no data may be a superblock 192 that has never been written to or that has been erased and may be referred to as an empty superblock.

In some cases, a controller 175 or a local controller 177 may perform operations (e.g., as part of one or more media management algorithms) for a memory array 180, such as wear leveling, background refresh, garbage collection, scrub, block scans, health monitoring, or others, or any combination thereof. For example, within a memory array 180, a block group 186 may have some block 188 containing valid data and some block 188 containing invalid data. To avoid waiting for all of the block 188 in the block group 186 to have invalid data in order to erase and reuse the block group 186, an algorithm referred to as "garbage collection" may be invoked to allow the block group 186 to be erased and released as a free block for subsequent write operations. Garbage collection may refer to a set of media management operations that include, for example, selecting a block group 186 that contains valid and invalid data, selecting block 188 in the block group 186 that contain valid data, copying the valid data from the selected blocks 188 to new locations (e.g., free block 188 in another block group 186), marking the data in the previously selected block 188 as invalid, and erasing the selected block group 186. As a result, the quantity of block groups 186 that have been erased may be increased such that more block groups 186 are available to store subsequent data (e.g., data subsequently received from the host system 105 or memory system controller 140).

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command and address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

In some examples, the system 100 may include a switch (not shown) that is used to selectively couple a host system 105 with a memory system 110. In some examples, the switch may be respective examples of a CXL switch, a PCIe switch, a Gen-Z switch, an OpenCAPI switch, or an Ethernet switch, among other types of switches that support selectively coupling a host system 105 (e.g., on-chip processors) to memory systems 110 (e.g., off-chip storage).

In some examples, the memory device 155 may be referred to as or include byte-addressable memory, and the memory device 170 may be referred to as or include block-addressable memory. For example, the memory device 155 may be operable to store data that may be accessed and manipulated at a byte-level of granularity. For instance, a byte included in the memory device 155 may have a unique address that may be utilized to read data from or write data to the byte. The memory device 170 may be operable to store data that may be accessed and manipulated at the block-level of granularity. For example, the memory device 170 may include data that may be stored in the blocks 188 that may be a fixed-size. A block 188 may be associated with a unique address that may be used to read data from or write data to the block 188.

In some examples, a memory device 170 (e.g., or other block-addressable memory) may be characterized by various limitations that may negatively affect performance, such as relatively higher latency (e.g., sequential access latency, random access latency, asymmetric latency), lower bandwidth, higher wear-out, or a combination thereof, relative to a memory device 155. However, a memory device 170 may also be associated with a high storage capacity of non-volatile memory. The memory device 155 (e.g., or other byte-addressable memory), conversely, may exhibit lower latencies and higher bandwidths for fine-grained (e.g., page-line sized) sequential and random access operations. The memory device 155, however, may also include volatile memory that may not be suitable for storing data for an extended period of time.

In accordance with examples described herein, a memory system controller 140 may guide data rearrangement such that the performance and efficiency of the memory system 110 may be improved. For example, the memory system controller 140 may utilize metadata and various access commands to rearrange associated data within the memory device 170 such that the data is written to a singular superblock 192 of the memory device 170. This data rearrangement may enable the memory system controller 140 to manipulate and store the data within the other superblocks 192 of the memory device 170 such that the storage of each superblock 192 may be efficiently utilized, while supporting subsequent sequential (e.g., and/or parallel) data accesses. Additionally, or alternatively, a data cache organization and replacement policy may be utilized to further contribute to efficient data management and data transfer between a memory device 155 and a memory device 170. These techniques may be implemented in a main memory-like setting, such as a CXL main memory module, which may allow commonly-seen and predictable main memory loop strides to drive a memory-side data prefetcher such that overall bandwidth may increase, while latency and wear-out may decrease.

In addition to applicability in systems as described herein, techniques for data rearrangement may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by improving memory access speeds, which may decrease processing or latency times, improve response times, or otherwise improve user experience, among other benefits.

Additionally or alternatively, techniques for data rearrangement may be generally implemented to support virtual reality or augmented reality applications. As the presence and use of virtual, augmented, extended, and other reality devices increases, electronic devices that support unique aspects of these technologies may be desired. For example, virtual reality and augmented reality devices and applications may benefit from faster processing to boost user immersion, and wearable electronic devices that support virtual reality or augmented reality may be subject to various size, weight, or other considerations. Implementing the techniques described herein may support virtual, augmented, extended, and other reality devices or techniques by improving response speed, resulting in an enhanced user experience, among other benefits.

Additionally or alternatively, techniques for data rearrangement may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory devices capable of effectively and efficiently storing relatively large quantities of data or accessing stored data relatively quickly. Implementing the techniques described herein may support artificial intelligence and/or machine learning techniques by improving memory access speeds and increasing memory capacity or density, among other benefits.

Figure 2:
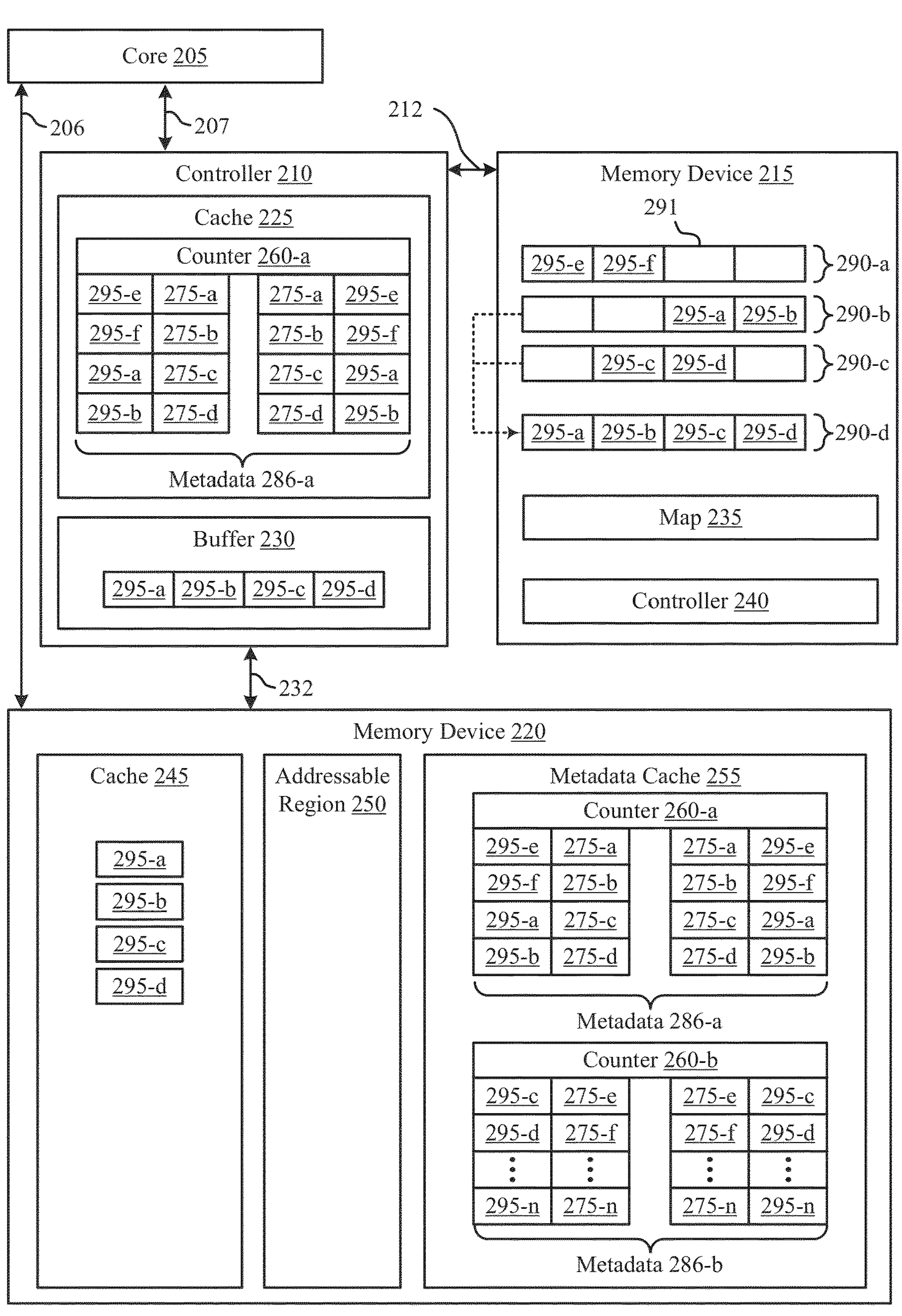

FIG. 2 illustrates an example of a system 200 (e.g., a memory system) that supports data rearrangement techniques for memory in accordance with examples as disclosed herein. The system 200 may be implemented by aspects of a system 100 or one or more components thereof (e.g., a memory system 110, a memory device 155, a memory device 170) as described with reference to FIG. 1. The system 200 may include a core 205, which may be coupled with (e.g., via a CXL switch), included in, or be an example of a host system 105 as described with reference to FIG. 1. In some examples, the core 205 may be an example of an on-chip processor. The core 205 may be coupled with a controller 210, which may be an example of or included in a memory system controller 140 as described with reference to FIG. 1. Additionally, although non-limiting examples of the system 200 herein are generally described in terms of applicability to memory systems, memory sub-systems, memory devices, or a combination thereof, examples of the system 200 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

The system 200 may also include a memory device 215 (e.g., a NAND device, an SSD device) that may be an example of a memory device 170 as described with reference to FIG. 1. For example, the memory device 215 may be an example of a block-addressable memory device. The memory device 215 may include one or more superblocks 290 (e.g., superblocks 290-*a* through 290-*d*), which may be examples of one or more superblocks 192 as described with reference to FIG. 1. A superblock 290 may include a set of blocks 291 that may be operable to store data 295 (e.g., data 295-*a* through 295-*n*). A block 291 may be an example of a block 188 as described with reference to FIG. 1 The memory device 215 may include a map 235. The map 235 may be an example of a flash transition layer (FTL) mapping table, or another LBA mapping table, that may provide a logical-to-physical mapping of the data 295 within the blocks 291. The map 235 may also indicate which blocks 291 are included in respective superblocks 290. The memory device 215 may also include a controller 240. The controller 240 may be an example of a controller 175, as described with reference to FIG. 1.

The system 200 may include a memory device 220 (e.g., a DRAM device) that may be an example of a memory device 155 as described with reference to FIG. 1. For example, the memory device 155 may be an example of a byte-addressable memory device. The memory device 220 may include a metadata cache 255, an addressable region 250, and a cache 245. The metadata cache 255 may be operable to store metadata 286, which may be used to support prefetch operations. For example, the metadata 286 may indicate a history of one or more previous access sequences that may be replayed in advance, such as when a start of a previously-observed sequence begins. As such, the metadata 286 may be used to predict subsequent data accesses in accordance with an observed sequence to support prefetching the data in accordance with the predictions. In the example of FIG. 2, the metadata 286 may support implementation of a temporal prefetcher, such as a managed irregular stream buffer (MISB) prefetcher. For example, metadata 286 may map physical addresses of data 295 to structural addresses 275 (e.g., physical address of data 295-*e* to structural address 275-*a*, and so on) of data 295 and map structural addresses 275 to physical addresses of data 295 (e.g., structural address 275-*a* to physical address of data 295-*e*, and so on). In some examples, the metadata cache 255 may store one or more counters 260 (e.g., a counter 260-*a*, a counter 260-*b*) associated with metadata 286. For example, a counter 260 may be used to count a quantity of accesses of respective metadata 286. In some examples, a counter 260 may be referred to as a confidence counter.

The addressable region 250 may be a flat address space that is directly accessible by a host system, such as the core 205. For example, the core 205 and the memory device 220 may be coupled via a bus 206 via which the core 205 may directly access the memory device 220 (e.g., the addressable region 250). The cache 245 may include volatile memory that is operable to store data 295. The cache 245 may be addressable at a byte-level of granularity. In some examples, the cache 245 may store frequently-accessed data 295 or prefetched data 295. The cache 245 may be associated with a higher bandwidth and lower access latency relative to the memory device 215. Accordingly, the cache 245 may provide high bandwidth and low latency access to data 295, while the memory device 215 may provide non-volatile and high capacity storage of the data 295.

The system 200 may include the controller 210. The controller 210 may include a cache 225 that may store metadata 286. In some examples, the cache 225 may be referred to as a metadata cache. In some examples, the controller 210 may include (e.g., generate, maintain, store) one or more counters 260. The controller 210 may increment a counter 260, for example, for each access to metadata 286 associated with the counter 260. For example, if metadata 286-*a* is accessed, such as to support prefetching, the controller 210 may increment the counter 260-*a*. The controller 210 may also include a buffer 230. The buffer 230 may temporarily store accessed or prefetched data 295. In some examples, data 295 transferred between the memory device 215 and the memory device 220 may be transferred via the buffer 230. In some examples, the buffer 230 may include sufficient storage to store a quantity of data 295 storable by one or more superblocks 290, which may allow for efficient transfer of data 295 between the memory device 215 and the memory device 220.

The controller 210 may facilitate communications between the core 205 and the memory devices 215 and 220. For example, the controller 210 may be coupled with the core 205 via a bus 207, the memory device 215 via a bus 212, and the memory device 220 via a bus 232. Communications between the core 205 and the memory devices 215 and 220 may be routed via the controller 210 via respective buses.

The controller 210, which may be an example of a prefetch controller, may support (e.g., control, facilitate, perform) prefetching data 295 from (e.g., stored within) the memory device 215 to the memory device 220 (e.g., or directly to the core 205, such as directly to host system memory). The controller 210 may support prefetching utilizing the metadata 286 stored within one or more of the cache 225 or the metadata cache 255. In some examples, the controller 210 may learn data accesses requested by the core 205 (e.g., generate and store the metadata 286 indicating the data accesses) to predict future data accesses. For example, the controller 210 may receive access commands (e.g., requests) to access data 295 from the memory device 220. In response to an access command, the controller 210 may access the cache 245 of the memory device 220 to determine whether the cache 245 includes the data 295 requested. In the case that the requested data 295 is not located in the cache 245, the controller 210 may access the memory device 215 to retrieve the data 295 and transfer the data 295 to the cache 245 (e.g., and/or to the core 205).

The controller 210 may perform one or more prefetch operations in accordance with a prefetch policy, for example, based on the cache 245 not storing the requested data 295 (e.g., which may be referred to as a cache miss). For example, in response to a cache miss, the controller 210 may initiate the prefetch policy and access the cache 225 to determine whether metadata 286 associated with the requested data 295 is stored in the cache 225. If the metadata 286 is not included in the cache 225, the controller 210 may transfer the metadata 286 from the metadata cache 255 to the cache 225. The controller 210 may utilize the metadata 286 to predict future data requests. For example, if the data 295-*a* is the requested data 295, the controller 210 may access the metadata 286-*a* to determine the structural address 275-*c*. The controller 210 may increment the structural address

275-*c* to the structural address 275-*d* to determine a next predicted data 295 to be accessed. For example, the controller 210 may use the metadata 286 to map the structural address 275-*d* to the data 295-*b* to determine which data 295 to prefetch to the cache 245. The controller 210 may move (e.g., copy, transfer, prefetch) the data 295-*b* to the cache 245 of the memory device 220 such that the data 295-*b* may be easily accessible for potential future requests (e.g., to avoid a subsequent cache miss for the data 295-*b*). Thus, the controller 210 may utilize the metadata 286 associated with the data 295 to prefetch data associated with the future accesses from the memory device 215 to the memory device 220 before receiving a command from the core 205 to access the future data such that the access latency associated with the system 200 may decrease.

In some cases, the controller 210 may prefetch additional data 295 to the cache 245 in response to a cache miss. For example, using metadata 286, the controller 210 may determine to prefetch data 295-*c* and 295-*d* to the cache 245 in response to the cache miss for the data 295-*a*. In some cases, data 295 prefetched by the controller 210 may be located in different superblocks 290 of the memory device 215. For example, the data 295-*b* may be located in a superblock 290-*b*, and the data 295-*c* and 295-*d* may be located in the superblock 290-*c*. Accessing data 295 in different superblocks 290 may be associated with a higher latency than accessing data 295 in a same superblock 290 (e.g., may have a random access latency as compared to a sequential access latency), which may increase a latency of prefetch operations and reduce performance of the system 200.

In accordance with examples described herein, the controller 210 may initiate data rearrangement techniques to improve performance and efficiency of the system 200. For example, the cache miss of the data 295-*a* in the cache 245 may trigger loading the data 295-*a*and prefetching additional data 295 to the cache 245. For example, the controller 210 access the metadata 286-*a* to identify the data 295-*b* for prefetching and may use the buffer 230 to transfer the data 295-*b* to the cache 245. The controller 210 may increment the counter 260-*a* based on accessing the metadata 286-*a*.

In the example of FIG. 2, the metadata 286-*a* may exclude a next structural address 275 after the structural address 275-*d* (e.g., a structural address 275-*c*), and the controller 210 may determine whether metadata 286 that includes the next structural address 275 (e.g., metadata 286-*b*) is stored in the cache 225. In the example of FIG. 2, the metadata 286-*b* may not be stored to the cache 225, and the controller 210 may transfer the metadata 286-*b* to the cache 225. The controller 210 may use the metadata 286-*b* to identify additional data 295-*c* (e.g., corresponding to structural address 275-*c*) and data 295-*d* (e.g., corresponding to structural address 275-*f*) for prefetching and may use the buffer 230 to transfer the data 295-*c* and 295-*d* to the cache 245. Other quantities of data 295 may be prefetched using the buffer 230 and metadata 286, for example, in accordance with a quantity of blocks 291 included in a superblock 290 as described herein. The controller 210 may increment a counter 260-*b* based on accessing the metadata 286-*b*.

In some examples, the controller 210 may transfer (e.g., retrieve, prefetch) data 295 (e.g., the data 295-*a*, 295-*b*, 295-*c*, and 295-*d*) to the addressable region 250 or the core 205 rather than to the cache 245. By prefetching to the addressable region 250, or otherwise operating in a flat address space of the host system memory, prefetching data 295 to the cache 245 may be unnecessary. Operating in the addressable region 250 may allow for the data 295 to be moved directly into the memory of the core 205, which may be beneficial for a core 205 utilizing a specific protocol (e.g., a CXL protocol). In such a case, various prefetch recommendations (e.g., the prefetched data 295) may be stored in the addressable region 250 as a list that the core 205 can read, and the prefetched data 295 may be swapped into host memory.

In some examples, the controller 210 may determine that a value of the counter 260 satisfies (e.g., is greater than, is greater than or equal to) a threshold and may initiate rearrangement of the data 295, for example, to reduce latency associated with future accesses of the data 295. To support rearranging the data 295, the controller 210 may prefetch a quantity of the data 295 based on a quantity of data storable by a superblock 290. For example, the controller 210 may set the quantity of the data 295 to be prefetched to correspond to N-1, wherein N is the quantity of blocks 291 included in a superblock 290. For example, in the example of FIG. 2, the data 295 to be rearranged may include the data 295-*a*, corresponding to the data retrieved in response to the cache miss, and the prefetched data 295-*b*, 295-*c*, and 295-*d*. As such, the quantity of data 295 buffered by the buffer 230 (e.g., as part of retrieving the data 295-*a* and prefetching the data 295-*b*, 295-*c*, and 295-*d*) may be the same size as a superblock 290.

In some examples, as the data 295 is buffered to the buffer 230, the controller 210 may transfer (e.g., write) the data 295 to the cache 245 (e.g., in the order at which it is retrieved and prefetched). That is, the controller 210 may write the data 295-*b*, data 295-*c*, and 295-*d* to the cache 245, such that the contents of the buffer 230 are copied to the cache 245.

After the data 295 is buffered in the buffer 230, the contents of the buffer 230 may also be written (e.g., copied) to an empty superblock 290 (e.g., a superblock 290-*d*), such that the data 295 is rearranged within the memory device 215 relative to before the data 295 was retrieved and prefetched. For example, the data 295 buffered to the buffer 230 may be from more than one of the superblocks 290 (e.g., the superblock 290-*b*, the superblock 290-*c*). To support rearranging the data 295 such that the data 295 is stored in a same superblock 290, the controller 210 may transmit the data 295 stored in the buffer 230, along with a superblock write identifier (e.g., a hint, a write command that includes the superblock write identifier), to the controller 240. The superblock write identifier may indicate that the data 295 is to be written to a same superblock 290. For example, the superblock-write identifier may indicate to the controller 240 that the received data 295 (e.g., the data 295-*a* through 205-*d*) is associated with a predicted sequence of blocks 291 associated with prefetching and is to be written to a same superblock 290 (e.g., an empty superblock 290), for example, to reduce latency associated with a subsequent access of the data 295.

In some examples, the controller 240 may ignore the superblock write identifier (e.g., hint), and the data 295 may remain in the one or more superblocks 290. In some examples, the controller 240 may ignore the superblock write identifier based on determining that the blocks 291 in which the received data 295 are currently stored are included in a same superblock 290. Alternatively, in the case that the controller 240 determines that the data 295 was originally stored in the blocks 291 of more than one of the superblocks 290, the controller 240 may write the data 295 received from the buffer 230 of the controller 210 to an empty superblock 290 (e.g., the superblock 290-*d*), such as in the same order that it is received. The controller 240 may update the map 235 to indicate that the data 295 is stored to the superblock 290-*d* (e.g., has been copied to the superblock 290-*d*), which may invalidate the data 295 of the scattered blocks 291 within the superblocks 290 (e.g., invalidate the data 295 stored in the blocks 291 of the superblocks 290-*b* and 290-*c*).

By rearranging the data 295 such that the portions of the data 295 with high access counts may be located within a same superblock 290 rather than spread out across different superblocks 290, the bandwidth and latency of the system 200 may be improved. For example, rearranging the data 295 may serialize sequences of data 295 having relatively high confidence that the next time the data 295 of a sequence will all be requested at a same time (e.g., based on a value of one or more counters 260 satisfying a threshold) into a same superblock 290. As such, the sequences of data 295 may be sequentially accessed or accessed in parallel (e.g., due to being located in a same superblock 290), which may reduce a latency of accessing the sequences of data 295 compared to perform random accesses to access the data 295.

Data 295 may be determined to be from different superblocks 290 according to various techniques. For example, based on receiving the data 295 from the buffer 230 and the superblock write identifier, the controller 240 may access the map 235 in which of the superblocks 290 the blocks 291 that currently store the data 295 are included. Additionally or alternatively, a data read attribute "block identifier" may be introduced to indicate from which superblock 290 given data 295 is retrieved. For example, as part of reading the data 295, for example, as part of retrieving the data 295 in response to a cache miss or as part of prefetching the data 295, a respective identifier may indicate to the controller 240 and/or the controller 210 in which superblock 290 the data 295 is stored. Accordingly, respective identifiers of data 295 may indicate whether the data 295 buffered to the buffer 230 is from a same superblock 290 or at least two different superblocks 290.

In some examples, the controller 210 may rearrange the data 295 as a background operation. For example, in some cases, the controller 210 may facilitate the rearrangement of data 295 (e.g., the superblock write identifier may be transmitted and/or the data 295 may be written to a same superblock) concurrent with prefetching the data 295 (e.g., the data 295-*b* through 295-*d*). In some other cases, rather than rearranging the data 295 in conjunction with (e.g., concurrent with) performing a prefetching operation, the controller 210 may utilize metadata 286 to rearrange the data 295 during periods of low bandwidth utilization, low power mode, or when a memory system that includes the controller 210 (e.g., a memory system 110) is in an idle state. For example, the controller 210 may identify that the memory system is an idle state and traverse metadata 286 stored in the cache 225 and/or the metadata cache 255, for example, to determine whether any counters 260 satisfy a data rearrangement threshold. If the threshold is satisfied, the controller 210 may cause the associated data 295 to be rearranged. Rearranging the data 295 as part of a background operation may help to conserve power and reduce the workload on the system 200, while still allowing for efficient data rearrangement. Such data rearrangement may also reduce prefetch latency, for example, by performing the data rearrangement before an associated prefetch operation is performed.

The counters 260 used to trigger data rearrangement (e.g., and data prefetching) may be implemented according to various techniques. For example, a counter 260 may be implemented as a saturating reuse counter. Here, a counter 260 may include one or more bits for each respective block of metadata 286. If metadata 286 is loaded into the cache 225 from the metadata cache 255, the controller 210 may reset corresponding counter 260 to zero. While the metadata 286 is in the cache 225, upon each access to the metadata 286, the controller 210 may increment the counter 260. The counter 260 may be associated with one or more thresholds for triggering data rearrangement and data prefetching. For example, in the case that the value of a counter 260 satisfies (e.g., reach or exceed) a first threshold, the controller 210 may perform one or more prefetches of data 295 using metadata 286 associated with the counter 260. In the case that the value of the counter 260 may satisfy a second threshold, the controller 210 may initiate data rearrangement operations. In some examples, the second threshold may be greater than the first threshold.

Additionally or alternatively, a counter 260 may be implemented as a persistent metadata counter. Here, a value of a counter 260 may be saved when an associated block of metadata 286 is evicted from the cache 225, and the value of the counter 260 may be reused and adjusted when the associated block of metadata 286 is reloaded to the cache 225. For example, metadata 286 may be evicted from the cache 225 to the metadata cache 255, for example, in accordance with a cache replacement policy, such as least recently used (LRU) cache replacement policy, among other types of cache replacement policies. The controller 210 may store a value of a counter 260 used to count accesses to the metadata 286 at the time of the eviction and a timestamp of the eviction. The controller 210 may subsequently transfer (e.g., reload) the metadata 286 back to the cache 225 and use the stored timestamp to determine a duration of time between storing the value of the counter (e.g., the eviction of the metadata 286) and the transfer of the metadata 286. The controller 210 may update the stored value of the counter 260 based on the duration of time. For example, a number corresponding to the amount of time elapsed may be subtracted from the stored value of the counter 260. For instance, the controller 210 may reduce the value of the counter 260 by a value that is proportional to the duration of time. In some examples, the counter 260 may be associated with one or more thresholds (e.g., a first threshold and a second threshold) for triggering data prefetching and data rearrangement.

In some other examples, a counter 260 may not be utilized in association with triggering data rearrangement. For example, in the case that a counter 260 is not utilized (e.g., or is deactivated), the controller 210 may prefetch the data 295 and initiate rearrangement of the data 295 on each cache miss.

In some examples, the confidence associated with data prefetching may be defined as a likelihood of prefetch recommendations using associated metadata 286 resulting a cache hit (e.g., whether the prefetched data actually used). Here, each cache line of the cache 245 may include a "prefetched" bit that indicates whether data of the cache line was prefetched to the cache (e.g., installed by a prefetcher, such as the controller 210), along with a pointer to a block of metadata 286 used to prefetch the data (e.g., data 295). On a cache hit (e.g., the data being requested by and transmitted to the core 205), the controller 210 may increment a counter 260 associated with the block of metadata 286. In some examples, such incrementation of the counter 260 may be performed instead of incrementing the counter 260 based on accessing the metadata 286 in the cache 225.

In some examples, the system 200 may support persistent saving of prefetch metadata in which metadata 286 may be backed up to persistent memory (e.g., non-volatile memory)

on power loss or in response to a command to back up the metadata 286, such as being backed up to memory of the memory device 215. For example, based on a power loss event (e.g., based on receiving an indication of a power loss event, such as a powering down of the memory system) or a command from the core 205 to store the metadata 286 to non-volatile memory (e.g., based on an address range, program identifier, or host identifier that owns the metadata 286), the controller 210 may store (e.g., transfer) metadata 286 in the cache 225 to non-volatile memory of the system 200 (e.g., of the memory device 215) to preserve the prefetch predictions associated with the metadata 286 upon restarting the system 200 (e.g., the memory system). Additionally, or alternatively, based on the power loss event, the metadata 286 of the metadata cache 255 may be stored to the memory device 215 to be recovered on a subsequent power up (e.g., restart) event. For example, based on a power up event after the power loss event, metadata 286 may be transferred from the memory device 215 to the metadata cache 255. Supporting persistent metadata storage may enable fast re-start of data prefetching with pre-trained predictions (e.g., rather than generating new metadata 286 after each power up event).

In some examples, a context field may be transmitted from the core 205 to the controller 210 along with read requests to improve the effectiveness of the controller 210. The data included in the context field may allow the controller 210 to separate prefetch streams by an instruction, a thread, or a process that may be enabling cache misses. By doing so, the controller 210 may predict which of the data 295 are likely to be accessed next and may prefetch them accordingly. Additionally, by separating prefetch streams based on the data included in the context field, the prefetcher may avoid interference between different threads or processes.

Figure 3:
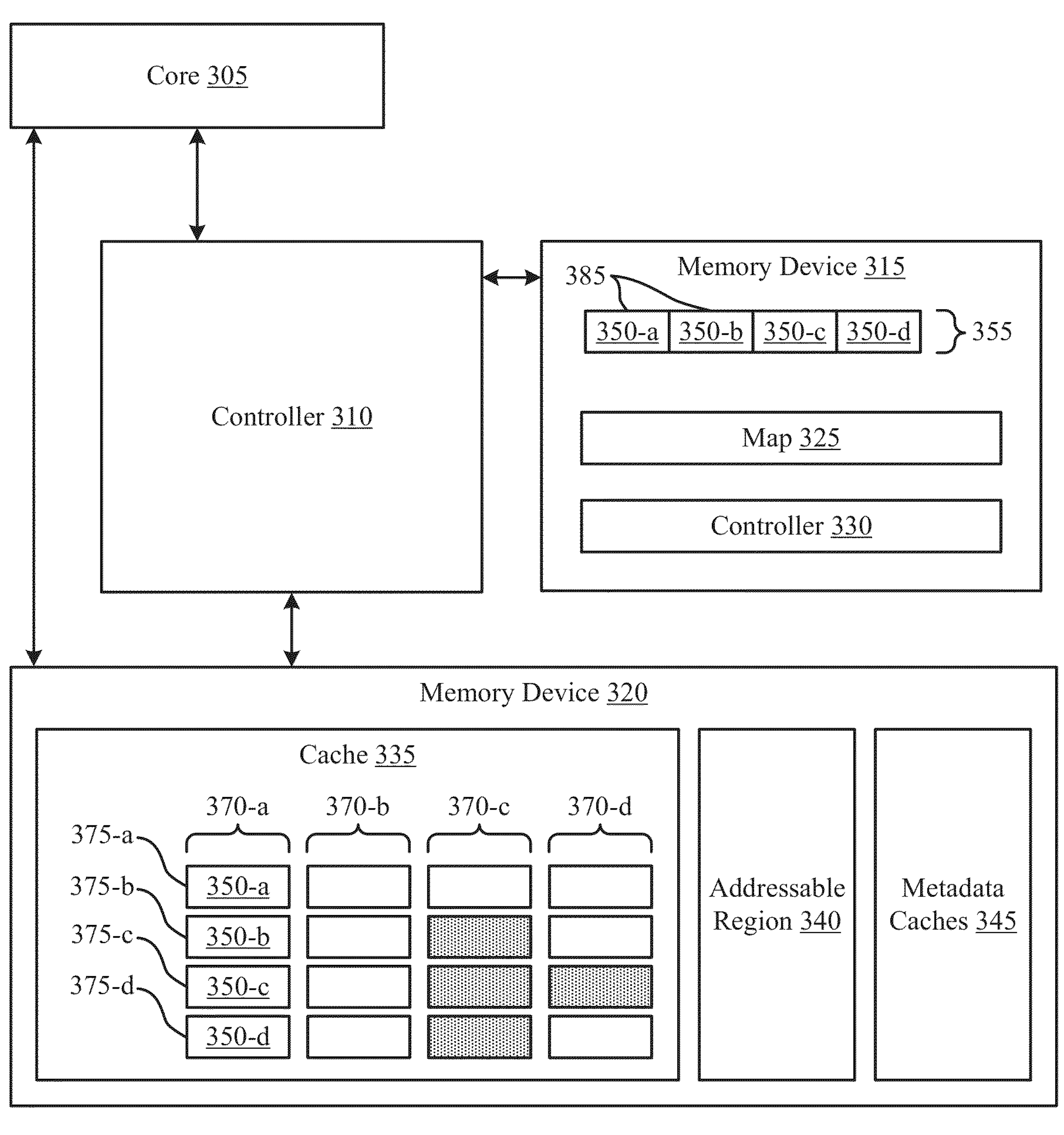

FIG. 3 shows an example of a system 300 that supports data rearrangement techniques for memory in accordance with examples as disclosed herein. The system 300 may be implemented by one or more aspects of a system 100 or 200 or one or more components thereof as described with reference to FIGS. 1 and 2. The system 300 may include a core 305, which may be an example of a core 205 as described with reference to FIG. 2. The core 305 may be coupled with a controller 310, which may be an example of or included in a memory system controller 140 or a controller 210, as described with reference to FIGS. 1 and 2, respectively.

The system 300 may also include a memory device 315 that may be an example of a memory device 170 or a memory device 215 as described with reference to FIGS. 1 and 2. The memory device 315 may include one or more superblocks 355 that may include one or more blocks 385 operable to store data 350. The memory device 315 may include a map 325, which may be an example of a map 235. The memory device 315 may also include a controller 330, which may be an example of a controller 175 as described with reference to FIG. 1 or a controller 240 as described with reference to FIG. 2.

The system 300 may include a memory device 320 that may be an example of a memory device 155 or a memory device 220 as described with reference to FIGS. 1 and 2, respectively. The memory device 320 may include a metadata cache 345, an addressable region 340, and a cache 335 that may each be examples of a metadata cache 255, an addressable region 250, and a cache 245 as described with reference to FIG. 2.

The cache 335 may be structured to reduce wear-out of and increase write bandwidth to the memory device 315. For example, the cache 335 may include one or more of the cache lines 370 (e.g., a cache line 370-*a*, a cache line 370-*b*, a cache line 370-*c*, a cache line 370-*d*). Each of the cache lines 370 may be divided into sectors 375 that may each be the size of a block 385. In some examples, a size of each of the cache lines 370 may correspond to a size of a superblock 355 (e.g., 512 byte sectors 375 with an 8 kilobyte cache line size). For example, the cache line 370-*a* may include a sector 375-*a*, a sector 375-*b*, a sector 375-*c*, and a sector 375-*d*, and the size of each of the sectors 375 may equal the size of one of the blocks 385 such that the size of the cache line 370-*a* may equal the size of the superblock 355. The cache 335 may store data 350 transferred between the memory device 315 and the memory device 320. For example, the sector 375-*a* may store the data 350-*a*, the sector 375-*b* may store the data 350-*b*, the sector 375-*c* may store the data 350-*c*, and the sector 375-*d* may store the data 350-*d*. The data 350 stored in the cache 335 may be easily available to the controller 310 or to the core 305.

In some examples, one or more of the cache lines 370 may include modified sectors 390. For example, the cache line 370-*c* may include three of the modified sectors 390 and the cache line 370-*d* may include one modified sectors 390, while the cache lines 370-*a* and 370-*b* may include no modified sectors 390 (e.g., and may be referred to as clean cache lines 370). A modified sector 390 may include data 350 that is modified, for example, relative to the corresponding data recorded in the memory device 315 (e.g., or other main memory). In replacing a cache line 370 (e.g., deleting the data of the cache line 370 from the cache 335 to support the storage of other data in the cache 335), the controller 310 may first write the contents of modified sectors 390 of a cache line 370 to the memory device 315 before deleting the cache line 370 such that no data may be lost. However, writing data to the memory device 315 may be time-consuming and degrade the memory device 315. Thus, reducing the quantity of write operations to the memory device 315 may reduce wear-out of the memory device 315 and may increase overall performance of the system 300.

In some examples, a cache replacement policy may be implemented to reduce wear-out of the memory device 315 and increase write bandwidth to the memory device 315. Additionally, the sectored cache line structure may support reduced wear-out and increased write bandwidth. For example, the controller 310 (e.g., or a controller associated with the memory device 320, such as a controller 145 or a local controller 160) may select one of the cache lines 370 for replacement in an order of priority (e.g., a priority order) indicated by the cache replacement policy. For example, the priority order may indicate for the controller 310 to select cache lines 370 for replacement that include no modified sectors 390 (e.g., the cache lines 370-*a* or 370-*b*) first, followed by cache lines 370 with the most (e.g., the greatest quantity) of modified sectors 390 (e.g., the cache line 370-*c*) if there are no cache lines 370 without the modified sectors 390 remaining, followed by cache line 370 with a smaller quantity of modified sectors 390 (e.g., the cache line 370-*d*) last. In the case that the cache 335 may include more than one of the cache lines 370 that include no modified sectors 390 (e.g., cache lines 370 that include unmodified data and exclude modified data), the controller 310 may determine to replace the cache line 370 which may be the least recently used of the cache lines 370 without modified sectors 390. In the case that the controller 310 may replace the cache lines 370 including none of the modified sectors 390 (e.g., the cache line 370-*b*), the data stored in the sectors 375 of the unmodified cache line may already be up-to-date and it may be unnecessary to write the data to the memory device 315. As such, the controller 310 may delete the data of such a cache line (e.g., a cache line 370-*a* or 370-*b*) without writing the data back to the memory device 315, which may reduce writes to the memory device 315, thereby reducing wear-out of the memory device 315 and saving time and performance that would otherwise be spent writing to the memory device 315

In the case that the controller 310 may replace the cache line 370 including the most modified sectors 390 (e.g., the cache line 370-*c*) or to another cache line 370 including the modified sectors 390 (e.g., the cache line 370-*d*), writing a large quantity of modified data to the memory device 315 in a single replacement operation may increase (e.g., maximize) write bandwidth relative to write smaller quantities of modified data. In this case, the controller 310 may access the modified sectors 390 of the selected cache line 370 and may write (e.g., transfer) the modified data stored to the modified sectors 390 to the memory device 315. The controller 310 may then delete the selected cache line 370. Thus, implementing a sectored cache and replacement policy may result in the controller 310 efficiently storing data to the cache 335 and replacing cache lines 370 of the cache 335, which may improve the overall performance of the system 300.

Figure 4:
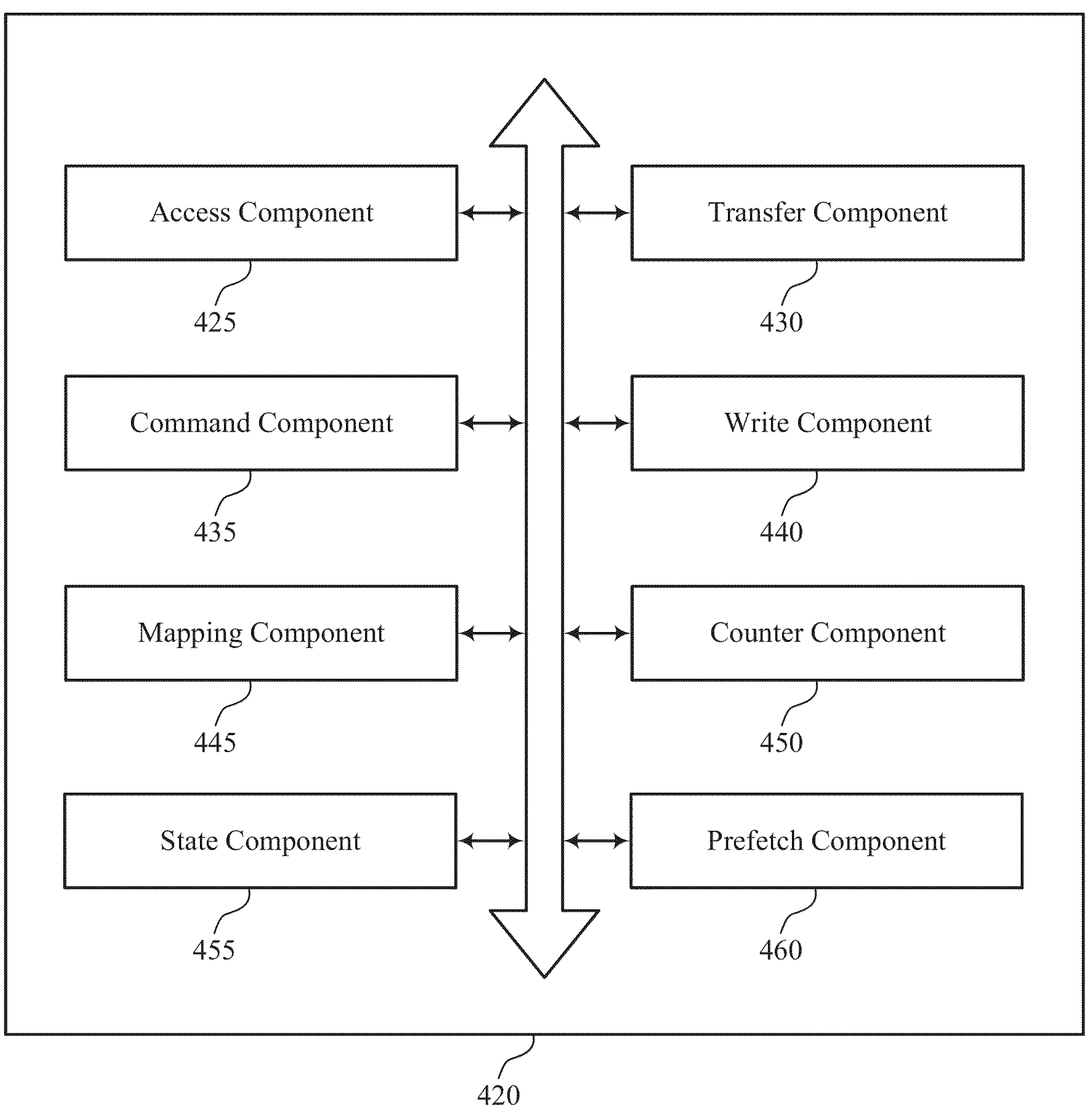
FIG. 4 shows an example of a block diagram that supports data rearrangement techniques for memory in accordance with examples as disclosed herein.

FIG. 4 shows a block diagram 400 of a memory system 420 that supports data rearrangement techniques for memory in accordance with examples as disclosed herein. The memory system 420 may be an example of aspects of a memory system as described with reference to FIGS. 1 through 3. The memory system 420, or various components thereof, may be an example of means for performing various aspects of data rearrangement techniques for memory as described herein. For example, the memory system 420 may include an access component 425, a transfer component 430, a command component 435, a write component 440, a mapping component 445, a counter component 450, a state component 455, a prefetch component 460, or any combination thereof. Each of these components, or components of subcomponents thereof (e.g., one or more processors, one or more memories), may communicate, directly or indirectly, with one another (e.g., via one or more buses).

The access component 425 may be configured as or otherwise support a means for accessing, by a controller of a memory system including a first memory device having a first type of memory and a second memory device having a second type of memory, first data from a first block of the first memory device. In some examples, the access component 425 may be configured as or otherwise support a means for accessing, by the controller based on accessing the first data, metadata associated with the first data in accordance with a prefetch policy. The transfer component 430 may be configured as or otherwise support a means for transferring, by the controller based on the metadata and the prefetch policy, second data from one or more second blocks of the first memory device to the second memory device, where the first block is included in a first superblock of the first memory device and at least one of the one or more second blocks is included in a second superblock of the first memory device. The command component 435 may be configured as or otherwise support a means for transmitting, from the controller to the first memory device, a command to write the first data and the second data to a third superblock of the first memory device based on a value of a counter associated with the metadata.

In some examples, the write component 440 may be configured as or otherwise support a means for writing, by the first memory device, the first data and the second data to the third superblock based on the command.

In some examples, the write component 440 may be configured as or otherwise support a means for ignoring, by the first memory device, the command to write the first data and the second data to the third superblock, where the first data remains in the first block and the second data remains in the one or more second blocks after the transmission of the command based on the ignoring.

In some examples, to support transferring the second data, the transfer component 430 may be configured as or otherwise support a means for transferring the second data based on a quantity of data storable by a respective superblock, where a quantity of the first data and the second data is equal to the quantity of data storable by the respective superblock.

In some examples, the second data is transferred to a cache of the second memory device concurrent with the transmission, performance, or both, of the command to write the first data and the second data to the third superblock.

In some examples, to support transmitting the command to write the first data and the second data to the third superblock, the command component 435 may be configured as or otherwise support a means for transmitting an indication that the first data and the second data are associated with a predicted sequence of blocks associated with a prefetch operation.

In some examples, the access component 425 may be configured as or otherwise support a means for accessing, by the first memory device based on the command, a mapping table to determine that the first block is included in the first superblock and the at least one of the one or more second blocks is included in the second superblock. In some examples, the write component 440 may be configured as or otherwise support a means for writing, by the first memory device, the first data and the second data to the third superblock based on the command and the determination. In some examples, the mapping component 445 may be configured as or otherwise support a means for updating, by the first memory device based on writing the first data and the second data to the third superblock, the mapping table to indicate that the first data and the second data are stored in the third superblock.

In some examples, the access component 425 may be configured as or otherwise support a means for determining that the first block is included in the first superblock and the at least one of the one or more second blocks is included in the second superblock based on a first identifier associated with the first block and a second identifier associated with the at least one of the one or more second blocks.

In some examples, the counter component 450 may be configured as or otherwise support a means for updating, based on accessing the metadata associated with the first data, the value of the counter associated with the metadata, where the value of the counter satisfies a threshold based on updating the value, and wherein the command is transmitted based on the value of the counter satisfying the threshold.

In some examples, the command is transmitted based on the value of the counter satisfying a threshold. In some examples, to support transferring the second data, the transfer component 430 may be configured as or otherwise support a means for transferring the second data in accordance with the prefetch policy based on the value of the counter satisfying a second threshold, where the second threshold is less than the threshold.

In some examples, the transfer component 430 may be configured as or otherwise support a means for evicting, by the controller after transferring the second data, the metadata from a metadata cache of the controller. In some examples, the counter component 450 may be configured as or otherwise support a means for storing, by the controller based on evicting the metadata, the value of the counter and a timestamp associated with evicting the metadata. In some examples, the transfer component 430 may be configured as or otherwise support a means for transferring, by the controller after storing the value, the metadata to the metadata cache in accordance with the prefetch policy. In some examples, the counter component 450 may be configured as or otherwise support a means for determining, based on the timestamp, a duration of time between storing the value of the counter and the transfer of the metadata to the metadata cache. In some examples, the counter component 450 may be configured as or otherwise support a means for updating the value of the counter based on the duration of time.

In some examples, to support updating the value of the counter, the counter component 450 may be configured as or otherwise support a means for reducing the value of the counter by a second value that is proportional to the duration of time.

In some examples, to support transferring the second data, the transfer component 430 may be configured as or otherwise support a means for transferring the second data to a cache of the second memory device or to a portion of the second memory device that is directly addressable by a host system.

In some examples, the write component 440 may be configured as or otherwise support a means for storing the metadata to the first memory device based on a power loss event associated with the memory system, a second command to store the metadata, or a combination thereof.

In some examples, the transfer component 430 may be configured as or otherwise support a means for transferring, based on a power up event after the power loss event, the metadata from the first memory device to the second memory device.

In some examples, a respective superblock of the first memory device includes a respective set of blocks.

Additionally, or alternatively, the access component 425 may be configured as or otherwise support a means for accessing, by a controller of a memory system including a first memory device having a first type of memory and a second memory device having a second type of memory, metadata associated with a prefetch operation to transfer data from the first memory device to the second memory device. The command component 435 may be configured as or otherwise support a means for transmitting, from the controller to the first memory device based on accessing the metadata, a command to write first data associated with a first superblock of the first memory device and second data associated with a second superblock of the first memory device to a third superblock of the first memory device based at least in part on a value of a counter satisfying a threshold.

In some examples, the state component 455 may be configured as or otherwise support a means for identifying, by the controller, a state of the memory system, where the state includes a low bandwidth utilization state, a low power state, an idle state, or a combination thereof, where the metadata is accessed based on the identifying.

In some examples, the command is transmitted based on the counter satisfying the threshold while the memory system is in the state.

In some examples, the prefetch component 460 may be configured as or otherwise support a means for performing, by the controller, the prefetch operation based on accessing the metadata, where the command is transmitted based on performing the prefetch operation.

Additionally, or alternatively, the command component 435 may be configured as or otherwise support a means for transmitting, by a controller of a memory system including a first memory device having a first type of memory and a second memory device having a second type of memory, a command to access data associated with a block of a superblock of the first memory device. The transfer component 430 may be configured as or otherwise support a means for transferring, based on the command, the data from the block to a cache of the second memory device, where the cache is associated with a cache line size equal to a size of the superblock, and where each cache line of the cache includes a quantity of sectors, a size of a respective sector being equal to a size of the block.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
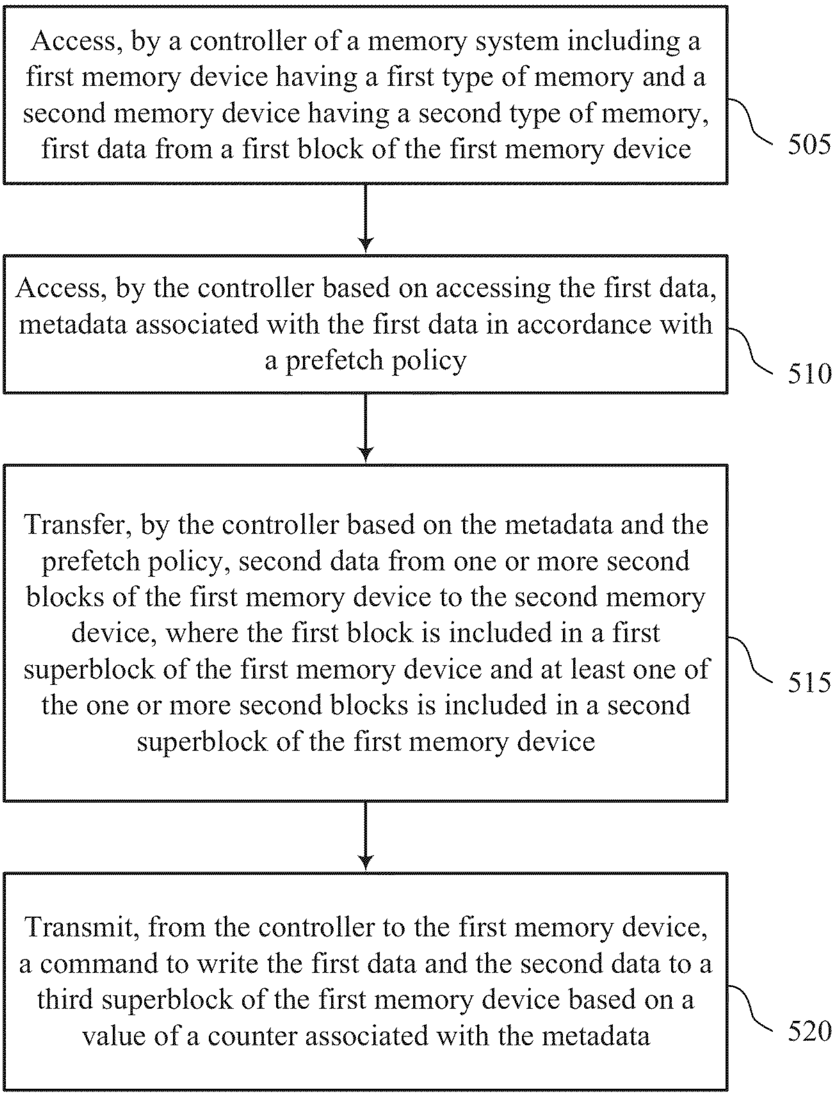

FIG. 5 shows a flowchart illustrating a method 500 that supports data rearrangement techniques for memory in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include accessing, by a controller of a memory system including a first memory device having a first type of memory and a second memory device having a second type of memory, first data from a first block of the first memory device. The operations of 505 may be performed in accordance with examples as disclosed herein. In some examples, the system including a first memory device (e.g., a memory device 170, 215) having a first type of memory and a second memory device (e.g., a memory device 155, 220) having a second type of memory, may include a controller (e.g., a controller 140, 210) that may access first data 295 from a first block 291 of the first memory device. In some examples, aspects of the operations of 505 may be performed by an access component 425 as described with reference to FIG. 4.

At 510, the method may include accessing, by the controller based on accessing the first data, metadata associated with the first data in accordance with a prefetch policy. The operations of 510 may be performed in accordance with examples as disclosed herein. In some examples, a controller 140, 210) may access metadata 286 (e.g., located in a cache 225, metadata cache 255) associated with the first data 295 in accordance with a prefetch policy. In some examples, aspects of the operations of 510 may be performed by an access component 425 as described with reference to FIG. 4.

At 515, the method may include transferring, by the controller based on the metadata and in accordance with the prefetch policy, second data from one or more second blocks of the first memory device to the second memory device, where the first block is included in a first superblock of the first memory device and at least one of the one or more second blocks is included in a second superblock of the first memory device. The operations of 515 may be performed in accordance with examples as disclosed herein. In some examples, a controller (e.g., a controller 140, 210) may transfer, based on metadata 286 and in accordance with a prefetch policy, second data 295 from one or more second blocks 291 of a first memory device (e.g., a memory device 170, 215) to a second memory device (e.g., a memory device 155, 220), where the first block 291 is included in a first superblock 290 of the first memory device and at least one of the one or more second blocks 291 is included in a second superblock 290 of the first memory device. In some examples, aspects of the operations of 515 may be performed by a transfer component 430 as described with reference to FIG. 4.

At 520, the method may include transmitting, from the controller to the first memory device, a command to write the first data and the second data to a third superblock of the first memory device based on a value of a counter associated with the metadata satisfying a threshold. The operations of 520 may be performed in accordance with examples as disclosed herein. In some examples, a controller (e.g., a controller 140, 210) may transmit, to a first memory device (e.g., a memory device 155, 220), a command to write the first data 295 and the second data 295 to a third superblock 290 of the first memory device based on a value of a counter 260 associated with the metadata 286 satisfying a threshold. In some examples, aspects of the operations of 520 may be performed by a command component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for accessing, by a controller of a memory system including a first memory device having a first type of memory and a second memory device having a second type of memory, first data from a first block of the first memory device; accessing, by the controller based on accessing the first data, metadata associated with the first data in accordance with a prefetch policy; transferring, by the controller based on the metadata and the prefetch policy, second data from one or more second blocks of the first memory device to the second memory device, where the first block is included in a first superblock of the first memory device and at least one of the one or more second blocks is included in a second superblock of the first memory device; and transmitting, from the controller to the first memory device, a command to write the first data and the second data to a third superblock of the first memory device based on a value of a counter associated with the metadata.

Aspect 2: The method, apparatus, or non-transitory computer-readable medium of aspect 1, further including operations, features, circuitry, logic, means, or instructions, or any combination thereof for writing, by the first memory device, the first data and the second data to the third superblock based on the command.

Aspect 3: The method, apparatus, or non-transitory computer-readable medium of aspect 1, further including operations, features, circuitry, logic, means, or instructions, or any combination thereof for ignoring, by the first memory device, the command to write the first data and the second data to the third superblock, where the first data remains in the first block and the second data remains in the one or more second blocks after the transmission of the command based on the ignoring.

Aspect 4: The method, apparatus, or non-transitory computer-readable medium of any of aspects 1 through 3, where transferring the second data includes operations, features, circuitry, logic, means, or instructions, or any combination thereof for transferring the second data based on a quantity of data storable by a respective superblock, where a quantity of the first data and the second data is equal to the quantity of data storable by the respective superblock.

Aspect 5: The method, apparatus, or non-transitory computer-readable medium of any of aspects 1 through 4, where the second data is transferred to a cache of the second memory device concurrent with the transmission, performance, or both, of the command to write the first data and the second data to the third superblock.

Aspect 6: The method, apparatus, or non-transitory computer-readable medium of any of aspects 1 through 5, where transmitting the command to write the first data and the second data to the third superblock includes operations, features, circuitry, logic, means, or instructions, or any combination thereof for transmitting an indication that the first data and the second data are associated with a predicted sequence of blocks associated with a prefetch operation.

Aspect 7: The method, apparatus, or non-transitory computer-readable medium of any of aspects 1 through 6, further including operations, features, circuitry, logic, means, or instructions, or any combination thereof for accessing, by the first memory device based on the command, a mapping table to determine that the first block is included in the first superblock and the at least one of the one or more second blocks is included in the second superblock; writing, by the first memory device, the first data and the second data to the third superblock based on the command and the determination; and updating, by the first memory device based on writing the first data and the second data to the third superblock, the mapping table to indicate that the first data and the second data are stored in the third superblock.

Aspect 8: The method, apparatus, or non-transitory computer-readable medium of any of aspects 1 through 7, further including operations, features, circuitry, logic, means, or instructions, or any combination thereof for determining that the first block is included in the first superblock and the at least one of the one or more second blocks is included in the second superblock based on a first identifier associated with the first block and a second identifier associated with the at least one of the one or more second blocks.

Aspect 9: The method, apparatus, or non-transitory computer-readable medium of any of aspects 1 through 8, further including operations, features, circuitry, logic, means, or instructions, or any combination thereof for updating, based on accessing the metadata associated with the first data, the value of the counter associated with the metadata, where the value of the counter satisfies a threshold based on updating the value, and wherein the command is transmitted based on the value of the counter satisfying the threshold.

Aspect 10: The method, apparatus, or non-transitory computer-readable medium of any of aspects 1 through 9, where the command is transmitted based on the value of the counter satisfying a threshold, and where transferring the second data includes operations, features, circuitry, logic, means, or instructions, or any combination thereof for transferring the second data in accordance with the prefetch policy based on the value of the counter satisfying a second threshold, where the second threshold is less than the threshold.

Aspect 11: The method, apparatus, or non-transitory computer-readable medium of any of aspects 1 through 10, further including operations, features, circuitry, logic, means, or instructions, or any combination thereof for evicting, by the controller after transferring the second data, the metadata from a metadata cache of the controller; storing, by the controller based on evicting the metadata, the value of the counter and a timestamp associated with evicting the metadata; transferring, by the controller after storing the value, the metadata to the metadata cache in accordance with the prefetch policy; determining, based on the timestamp, a duration of time between storing the value of the counter and the transfer of the metadata to the metadata cache; and updating the value of the counter based on the duration of time.

Aspect 12: The method, apparatus, or non-transitory computer-readable medium of aspect 11, where updating the value of the counter includes operations, features, circuitry, logic, means, or instructions, or any combination thereof for reducing the value of the counter by a second value that is proportional to the duration of time.

Aspect 13: The method, apparatus, or non-transitory computer-readable medium of any of aspects 1 through 12, where transferring the second data includes operations, features, circuitry, logic, means, or instructions, or any combination thereof for transferring the second data to a cache of the second memory device or to a portion of the second memory device that is directly addressable by a host system.

Aspect 14: The method, apparatus, or non-transitory computer-readable medium of any of aspects 1 through 13, further including operations, features, circuitry, logic, means, or instructions, or any combination thereof for storing the metadata to the first memory device based on a power loss event associated with the memory system, a second command to store the metadata, or a combination thereof.

Aspect 15: The method, apparatus, or non-transitory computer-readable medium of aspect 14, further including operations, features, circuitry, logic, means, or instructions, or any combination thereof for transferring, based on a power up event after the power loss event, the metadata from the first memory device to the second memory device.

Aspect 16: The method, apparatus, or non-transitory computer-readable medium of any of aspects 1 through 15, where a respective superblock of the first memory device includes a respective set of blocks.

FIG. 6 shows a flowchart illustrating a method 600 that supports data rearrangement techniques for memory in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include accessing, by a controller of a memory system including a first memory device having a first type of memory and a second memory device having a second type of memory, metadata associated with a prefetch operation to transfer data from the first memory device to the second memory device. The operations of 605 may be performed in accordance with examples as disclosed herein. In some examples, a controller (e.g., a controller 140, 210), of a memory system (e.g., a memory system 110) including a first memory device (e.g., a memory device 170, 215) having a first type of memory and a second memory device (e.g., a memory device 155, 220) having a second type of memory, may access metadata 286 (e.g., which may be located in a cache 225, metadata cache 255) associated with a prefetch operation to transfer data from the first memory device to the second memory device. In some examples, aspects of the operations of 605 may be performed by an access component 425 as described with reference to FIG. 4.

At 610, the method may include transmitting, from the controller to the first memory device based on accessing the metadata, a command to write first data associated with a first superblock of the first memory device and second data associated with a second superblock of the first memory device to a third superblock of the first memory device based at least in part on a value of a counter satisfying a threshold. The operations of 610 may be performed in accordance with examples as disclosed herein. In some examples, a controller (e.g., a controller 140, 210) may transmit, to the first memory device (e.g., memory device 155, 215) based on accessing the metadata 286, a command to write first data 295 associated with a first superblock 290 of the first memory device and second data 295 associated with a second superblock 290 of the first memory device to a third superblock 290 of the first memory device based at least in part on a value of a counter 260 satisfying a threshold. In some examples, aspects of the operations of 610 may be performed by a command component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 17: A method, apparatus, or non-transitory computer-readable medium including operations, features, circuitry, logic, means, or instructions, or any combination thereof for accessing, by a controller of a memory system including a first memory device having a first type of memory and a second memory device having a second type of memory, metadata associated with a prefetch operation to transfer data from the first memory device to the second memory device and transmitting, from the controller to the first memory device based on accessing the metadata, a command to write first data associated with a first superblock of the first memory device and second data associated with a second superblock of the first memory device to a third superblock of the first memory device based at least in part on a value of a counter satisfying a threshold.

Aspect 18: The method, apparatus, or non-transitory computer-readable medium of aspect 17, further including operations, features, circuitry, logic, means, or instructions, or any combination thereof for identifying, by the controller, a state of the memory system, where the state includes a low bandwidth utilization state, a low power state, an idle state, or a combination thereof, where the metadata is accessed based on the identifying.

Aspect 19: The method, apparatus, or non-transitory computer-readable medium of aspect 18, where the command is transmitted based on the counter satisfying the threshold while the memory system is in the state.

Aspect 20: The method, apparatus, or non-transitory computer-readable medium of aspect 17, further including operations, features, circuitry, logic, means, or instructions, or any combination thereof for performing, by the controller, the prefetch operation based on accessing the metadata, where the command is transmitted based on performing the prefetch operation.

FIG. 7 shows a flowchart illustrating a method 700 that supports data rearrangement techniques for memory in accordance with examples as disclosed herein. The operations of method 700 may be implemented by a memory system or its components as described herein. For example, the operations of method 700 may be performed by a memory system as described with reference to FIGS. 1 through 4. In some examples, a memory system may execute a set of instructions to control the functional elements of the device to perform the described functions. Additionally, or alternatively, the memory device may perform aspects of the described functions using special-purpose hardware.

At 705, the method may include transmitting, by a controller of a memory system including a first memory device having a first type of memory and a second memory device having a second type of memory, a command to access data associated with a block of a superblock of the first memory device. The operations of 705 may be performed in accordance with examples as disclosed herein. In some examples, a controller 310 of a memory system (e.g., a memory system 110, such as of a system 300) including a first memory device (e.g., a memory device 315) having a first type of memory and a second memory device (e.g., a memory device 320) having a second type of memory, may transmit a command to access data 350 associated with a block 385 of a superblock 355 of the first memory device. In some examples, aspects of the operations of 705 may be performed by an access component 425 as described with reference to FIG. 4.

At 710, the method may include transferring, based on the command, the data from the block to a cache of the second memory device, where the cache is associated with a cache line size equal to a size of the superblock, and where each cache line of the cache includes a quantity of sectors, a size of a respective sector being equal to a size of the block. The operations of 710 may be performed in accordance with examples as disclosed herein. In some examples, the controller 310 may transfer, based on the command, the data 350 from the block 385 to a cache 335 of the second memory device, where the cache 335 may be associated with a cache line size equal to a size of the superblock 355, and where each cache line 370 of the cache 335 may include a quantity of sectors 375, a size of a respective sector 375 being equal to a size of the block 385. In some examples, aspects of the operations of 710 may be performed by a transfer component 430 as described with reference to FIG. 4.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 21: A method, apparatus, or non-transitory computer-readable medium including operations, features, circuitry, logic, means, or instructions, or any combination thereof for transmitting, by a controller of a memory system including a first memory device having a first type of memory and a second memory device having a second type of memory, a command to access data associated with a block of a superblock of the first memory device and transferring, based on the command, the data from the block to a cache of the second memory device, where the cache is associated with a cache line size equal to a size of the superblock, and where each cache line of the cache includes a quantity of sectors, a size of a respective sector being equal to a size of the block.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: An apparatus, including: a first memory device having a first type of memory; a second memory device having a second type of memory; a buffer coupled with the first memory device and the second memory device, the buffer configured to transfer data between the first memory device and the second memory device in accordance with a prefetch operation; and a controller coupled with the first memory device, the second memory device, and the buffer, the controller configured to transmit, to the first memory device based on the prefetch operation, a command to write first data included in a first superblock of the first memory device and second data included in a second superblock of the first memory device to a third superblock of the first memory device.

Aspect 23: The apparatus of aspect 22, where the first memory device is configured to: write the first data and the second data to the third superblock based on the command.

Aspect 24: The apparatus of aspect 22, where the first memory device is configured to: ignore the command to write the first data and the second data to the third superblock, where the first data remains in the first superblock and the second data remains in the second superblock after the transmission of the command based on ignoring the command.

Aspect 25: The apparatus of any of aspects 22 through 24, where the controller includes a metadata cache configured to store metadata associated with the data and a counter for counting accesses of the metadata, the controller is configured to transmit the command based on a value of the counter satisfying a threshold.

Aspect 26: The apparatus of aspect 25, where the controller is further configured to: transfer the metadata from the second memory device to the metadata cache based on the prefetch operation; set the value of the counter to zero based on the transfer of the metadata to the metadata cache; and increment the value of the counter for each access of the metadata while the metadata is in the metadata cache, where the value of the counter satisfies the threshold based on incrementing the value of the counter.

Aspect 27: The apparatus of aspect 25, where the controller is further configured to: evict the metadata from the metadata cache to the second memory device; and store the value of the counter at a time of the eviction of the metadata and a timestamp of the eviction of the metadata.

Aspect 28: The apparatus of aspect 27, where the controller is further configured to: transfer, after storing the value of the counter, the metadata from the second memory device to the metadata cache; determine, based on the timestamp, a duration of time between storing the value of the counter and the transfer of the metadata to the metadata cache; and updating the value of the counter based on the duration of time.

Aspect 29: The apparatus of any of aspects 22 through 28, where the controller is configured to transmit the command based on performing the prefetch operation.

Aspect 30: The apparatus of any of aspects 22 through 29, where the first memory device includes a second controller configured to: access, based on the command, a mapping table of the first memory device to determine that the first data is included in the first superblock and that the second data is included in the second superblock; and update, based on writing the first data and the second data to the third superblock in accordance with the command, the mapping table to indicate that the first data and the second data are stored in the third superblock.

Aspect 31: The apparatus of any of aspects 22 through 30, where the controller is further configured to: transmit, to the first memory device, a second command to write third data included in a fourth superblock and fourth data included in a fifth superblock to a sixth superblock of the first memory device based on a state of the apparatus, the state of the apparatus including a low bandwidth utilization state, a low power state, an idle state, or a combination thereof.

An apparatus is described. The following provides an overview of aspects of the apparatus as described herein:

Aspect 32: An apparatus, including: a first memory device having a first type of memory and including one or more superblocks, each superblock including a quantity of blocks; and a second memory device having a second type of memory and coupled with the first memory device, the second memory device including a cache having a cache line size that is equal to a size of a respective superblock, where each cache line of the cache includes a quantity of sectors, where a size of a respective sector is equal to a size of a block of the first memory device.

Aspect 33: The apparatus of aspect 32, further including: a controller coupled with the first memory device and the second memory device, the controller configured to transfer data between the one or more superblocks of the first memory device and one or more cache lines of the cache.

Aspect 34: The apparatus of any of aspects 32 through 33, where the second memory device is configured to: select one or more cache lines of the cache to replace in accordance with a replacement policy indicating a priority order for cache line replacement, the priority order indicating to replace cache lines that include unmodified data and exclude modified data followed by cache lines having greater quantities of modified data relative to other cache lines that include modified data.

Aspect 35: The apparatus of aspect 34, where the second memory device is configured to: delete a selected cache line based on the cache line including unmodified data and excluding modified data.

Aspect 36: The apparatus of any of aspects 34 through 35, where the controller is further configured to transfer modified data from a selected cache line that includes the modified data to the first memory device, and the second memory device is configured to delete the selected cache line after the modified data is transferred to the first memory device.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component may initiate a change that allows signals to flow between the other components over a conductive path that previously did not permit signals to flow.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Due to the nature of software, functions described herein can be implemented using software executed by a processor, hardware, firmware, hardwiring, or combinations of any of these. Features implementing functions may be physically located at various positions, including being distributed such that portions of functions are implemented at different physical locations.

Illustrative blocks and modules described herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processor. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

accessing, by a controller of a memory system comprising a first memory device having a first type of memory and a second memory device having a second type of memory, first data from a first block of the first memory device;

accessing, by the controller based on accessing the first data, metadata associated with the first data in accordance with a prefetch policy;

transferring, by the controller based on the metadata and the prefetch policy, second data from one or more second blocks of the first memory device to the second memory device, wherein the first block is included in a first superblock of the first memory device and at least one of the one or more second blocks is included in a second superblock of the first memory device; and transmitting, from the controller to the first memory device, a command to write the first data and the second data to a third superblock of the first memory device based on a value of a counter associated with the metadata.

2. The method of claim 1, further comprising:

writing, by the first memory device, the first data and the second data to the third superblock based on the command.

3. The method of claim 1, further comprising:

ignoring, by the first memory device, the command to write the first data and the second data to the third superblock, wherein the first data remains in the first block and the second data remains in the one or more second blocks after the transmission of the command based on the ignoring.

4. The method of claim 1, wherein transferring the second data comprises:

transferring the second data based on a quantity of data storable by a respective superblock, wherein a quantity of the first data and the second data is equal to the quantity of data storable by the respective superblock.

5. The method of claim 1, wherein the second data is transferred to a cache of the second memory device concurrent with the transmission, performance, or both, of the command to write the first data and the second data to the third superblock.

6. The method of claim 1, further comprising:

accessing, by the first memory device based on the command, a mapping table to determine that the first block is included in the first superblock and the at least one of the one or more second blocks is included in the second superblock;

writing, by the first memory device, the first data and the second data to the third superblock based on the command and the determination; and updating, by the first memory device based on writing the first data and the second data to the third superblock, the mapping table to indicate that the first data and the second data are stored in the third superblock.

7. The method of claim 1, further comprising:

determining that the first block is included in the first superblock and the at least one of the one or more second blocks is included in the second superblock based on a first identifier associated with the first block and a second identifier associated with the at least one of the one or more second blocks.

8. The method of claim 1, further comprising:

updating, based on accessing the metadata associated with the first data, the value of the counter associated with the metadata, wherein the value of the counter satisfies a threshold based on updating the value, and wherein the command is transmitted based on the value of the counter satisfying the threshold.

9. The method of claim 1, wherein the command is transmitted based on the value of the counter satisfying a threshold, and wherein transferring the second data comprises:

transferring the second data in accordance with the prefetch policy based on the value of the counter satisfying a second threshold, wherein the second threshold is less than the threshold.

10. The method of claim 1, further comprising:

evicting, by the controller after transferring the second data, the metadata from a metadata cache of the controller;

storing, by the controller based on evicting the metadata, the value of the counter and a timestamp associated with evicting the metadata;

transferring, by the controller after storing the value, the metadata to the metadata cache in accordance with the prefetch policy;

determining, based on the timestamp, a duration of time between storing the value of the counter and the transfer of the metadata to the metadata cache; and updating the value of the counter based on the duration of time.

11. The method of claim 1, further comprising:

storing the metadata to the first memory device based on a power loss event associated with the memory system, a second command to store the metadata, or a combination thereof.

12. The method of claim 1, wherein a respective superblock of the first memory device comprises a respective set of blocks.

13. An apparatus, comprising:

a first memory device having a first type of memory;

a second memory device having a second type of memory;

a buffer coupled with the first memory device and the second memory device, the buffer configured to transfer data between the first memory device and the second memory device in accordance with a prefetch operation; and a controller coupled with the first memory device, the second memory device, and the buffer, the controller configured to transmit, to the first memory device based on the prefetch operation, a command to write first data included in a first superblock of the first memory device and second data included in a second superblock of the first memory device to a third superblock of the first memory device, wherein:

the controller comprises a metadata cache configured to store metadata associated with the data and a counter for counting accesses of the metadata, and the controller is configured to transmit the command based on a value of the counter satisfying a threshold.

14. The apparatus of claim 13, wherein the first memory device is configured to:

write the first data and the second data to the third superblock based on the command; or ignore the command to write the first data and the second data to the third superblock, wherein the first data remains in the first superblock and the second data remains in the second superblock after the transmission of the command based on ignoring the command.

15. The apparatus of claim 13, wherein the controller is further configured to:

transfer the metadata from the second memory device to the metadata cache based on the prefetch operation;

set the value of the counter to zero based on the transfer of the metadata to the metadata cache; and increment the value of the counter for each access of the metadata while the metadata is in the metadata cache, wherein the value of the counter satisfies the threshold based on incrementing the value of the counter.

16. The apparatus of claim 13, wherein the controller is further configured to:

evict the metadata from the metadata cache to the second memory device;

store the value of the counter at a time of the eviction of the metadata and a timestamp of the eviction of the metadata;

transfer, after storing the value of the counter, the metadata from the second memory device to the metadata cache;

determine, based on the timestamp, a duration of time between storing the value of the counter and the transfer of the metadata to the metadata cache; and updating the value of the counter based on the duration of time.

17. An apparatus comprising:

a first memory device having a first type of memory;

a second memory device having a second type of memory;

a buffer coupled with the first memory device and the second memory device, the buffer configured to transfer data between the first memory device and the second memory device in accordance with a prefetch operation; and a controller coupled with the first memory device, the second memory device, and the buffer, the controller configured to transmit, to the first memory device based on the prefetch operation, a command to write first data included in a first superblock of the first memory device and second data included in a second superblock of the first memory device to a third superblock of the first memory device, wherein the controller is further configured to:

transmit, to the first memory device, a second command to write third data included in a fourth superblock and fourth data included in a fifth superblock to a sixth superblock of the first memory device based on a state of the apparatus, the state of the apparatus comprising a low bandwidth utilization state, a low power state, an idle state, or a combination thereof.

18. A method, comprising:

accessing, by a controller of a memory system comprising a first memory device having a first type of memory and a second memory device having a second type of memory, metadata associated with a prefetch operation to transfer data from the first memory device to the second memory device; and transmitting, from the controller to the first memory device based on accessing the metadata, a command to write first data associated with a first superblock of the first memory device and second data associated with a second superblock of the first memory device to a third superblock of the first memory device based on a value of a counter for counting accesses of the metadata satisfying a threshold.

19. The method of claim 18, further comprising:

identifying, by the controller, a state of the memory system, wherein the state comprises a low bandwidth utilization state, a low power state, an idle state, or a combination thereof, wherein the metadata is accessed based on the identifying.

* * * * *